United States Patent
Lin et al.

(10) Patent No.: US 12,302,392 B2
(45) Date of Patent: May 13, 2025

(54) DATA SENDING METHOD AND COMMUNICATIONS DEVICE

(71) Applicant: HUAWEI TECHNOLOGIES CO., LTD., Guangdong (CN)

(72) Inventors: Yingpei Lin, Munich (DE); Lei Huang, Shanghai (CN); Yang Liu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 459 days.

(21) Appl. No.: 17/669,017

(22) Filed: Feb. 10, 2022

(65) Prior Publication Data

US 2022/0240318 A1 Jul. 28, 2022

Related U.S. Application Data

(63) Continuation of application No. 16/694,071, filed on Nov. 25, 2019, now Pat. No. 11,284,436, which is a (Continued)

(30) Foreign Application Priority Data

May 26, 2017 (CN) .......................... 201710386897.X

(51) Int. Cl.
*H04W 74/08* (2024.01)
*H04W 16/14* (2009.01)
(Continued)

(52) U.S. Cl.
CPC ....... *H04W 74/0816* (2013.01); *H04W 16/14* (2013.01); *H04W 72/0453* (2013.01); *H04W 72/1215* (2013.01)

(58) Field of Classification Search
CPC ............. H04W 16/14; H04W 72/0453; H04W 72/1215; H04W 74/0808; H04W 74/0816
(Continued)

(56) References Cited

U.S. PATENT DOCUMENTS 9,154,371 B1   10/2015 Srinivasan
10,374,760 B2 * 8/2019 Kim ...................... H04L 5/0012
(Continued)

FOREIGN PATENT DOCUMENTS

CN      106211350 A      12/2016
CN      106304371 A       1/2017
(Continued)

OTHER PUBLICATIONS

3GPP TS 36.213 V14.2.0 (Mar. 2017), 3rd Generation Partnership Project; Technical Specification Group Radio Access Network; Evolved Universal Terrestrial Radio Access (E-UTRA); Physical layer procedures(Release 14), total 454 pages.

*Primary Examiner* — Robert J Lopata
(74) *Attorney, Agent, or Firm* — WOMBLE BOND DICKINSON (US) LLP

(57) ABSTRACT

The present invention discloses a data sending method and a communications device. The method includes: sensing, by a communications device, a carrier located in a first unlicensed frequency band, where the first unlicensed frequency band includes at least one carrier; and sending, by the communications device, data on a carrier whose channel state is sensed to be idle. The communications device senses a first carrier in the first unlicensed frequency band, and sends the data on the first carrier that is successfully sensed to be idle. Another communications device may also sense in the first unlicensed frequency band, and send data in the first unlicensed frequency band when sensing successfully. Therefore, users of different services may fairly contend and coexist in an unlicensed frequency band.

20 Claims, 12 Drawing Sheets

Related U.S. Application Data continuation of application No. PCT/CN2018/086045, filed on May 8, 2018.

(51) Int. Cl.
  H04W 72/0453 (2023.01)
  H04W 72/12 (2023.01)
  H04W 74/0816 (2024.01)

(58) Field of Classification Search
  USPC ........................................................ 370/329
  See application file for complete search history.

(56) References Cited

U.S. PATENT DOCUMENTS

| | | | |
|---|---|---|---|
| 11,096,166 B2* | 8/2021 | Kim | H04W 74/0816 |
| 2013/0083753 A1 | 4/2013 | Lee et al. | |
| 2015/0373741 A1 | 12/2015 | Yerramalli et al. | |
| 2016/0066195 A1 | 3/2016 | Moon | |
| 2016/0073405 A1* | 3/2016 | Khawer | H04L 5/0007 |
| | | | 370/329 |
| 2016/0164638 A1 | 6/2016 | Seok | |
| 2016/0337869 A1 | 11/2016 | Dai | |
| 2017/0223738 A1 | 8/2017 | Seo et al. | |
| 2017/0223742 A1 | 8/2017 | Shimomura | |
| 2017/0251494 A1 | 8/2017 | Li | |
| 2017/0254850 A1 | 9/2017 | Huott | |
| 2017/0317798 A1 | 11/2017 | Kim | |
| 2018/0184455 A1* | 6/2018 | Wang | H04B 17/345 |
| 2018/0220447 A1 | 8/2018 | Kim et al. | |
| 2018/0235007 A1 | 8/2018 | Gou | |
| 2018/0263029 A1 | 9/2018 | Li | |
| 2018/0310337 A1 | 10/2018 | Cui | |
| 2018/0352560 A1* | 12/2018 | Feng | H04W 72/21 |
| 2019/0007972 A1 | 1/2019 | Gou | |
| 2019/0069312 A1* | 2/2019 | Oh | H04W 72/0446 |
| 2019/0109677 A1* | 4/2019 | Wang | H04L 5/1469 |
| 2019/0208537 A1* | 7/2019 | Ke | H04W 74/04 |
| 2019/0280733 A1* | 9/2019 | Li | H04W 72/0453 |
| 2020/0045558 A1* | 2/2020 | Park | H04W 74/0808 |
| 2020/0145954 A1 | 5/2020 | Wang | |
| 2020/0187253 A1* | 6/2020 | Cui | H04W 72/30 |
| 2021/0160825 A1* | 5/2021 | Li | H04W 74/0816 |
| 2021/0219339 A1 | 7/2021 | Tang | |

FOREIGN PATENT DOCUMENTS

| | | |
|---|---|---|
| CN | 106465431 A | 2/2017 |
| CN | 106658718 A | 5/2017 |
| CN | 106664729 A | 5/2017 |
| CN | 105103608 B | 12/2019 |
| WO | 2007108636 A1 | 9/2007 |
| WO | 2011018025 A1 | 2/2011 |
| WO | 2016047975 A1 | 3/2016 |
| WO | 2017030491 A1 | 2/2017 |
| WO | 2017030603 A1 | 2/2017 |
| WO | 2017061930 A1 | 4/2017 |

* cited by examiner

DATA SENDING METHOD AND COMMUNICATIONS DEVICE

CROSS-REFERENCE TO RELATED APPLICATIONS

This application is a continuation of U.S. patent application Ser. No. 16/694,071, filed on Nov. 25, 2019, which is a continuation of International Application No. PCT/CN2018/086045, filed on May 8, 2018. The International Application claims priority to Chinese Patent Application No. 201710386897.X, filed on May 26, 2017. All of the aforementioned patent applications are hereby incorporated by reference in their entireties.

TECHNICAL FIELD

The present application relates to the communications field, and more specifically, to a data sending method and a communications device.

BACKGROUND

An unlicensed spectrum resource is a spectrum resource that can be shared by communications devices without obtaining a license for authorized use. Currently, the unlicensed spectrum resource may be used for a WiFi user, an LTE user, or the like, and may be further used for a 5G user, a user of another service type, or the like in the future. How users of different service types fairly share the unlicensed spectrum resource is a problem that urgently needs to be resolved currently.

SUMMARY

In view of this, this application provides a data sending method and a communications device, to implement coexistence of users of different services in an unlicensed frequency band.

A first aspect provides a data sending method, where the method includes: sensing, by a communications device, a carrier located in a first unlicensed frequency band, where the first unlicensed frequency band includes at least one carrier; and sending, by the communications device, data on a carrier whose channel state is sensed to be idle. Therefore, the communications device senses a first carrier in the first unlicensed frequency band, and sends the data on the first carrier that is successfully sensed. Another communications device may also sense in the first unlicensed frequency band, and send data in the first unlicensed frequency band when sensing successfully. Therefore, users of different services may fairly contend and coexist in an unlicensed frequency band.

According to the first aspect, in a first embodiment of the data sending method, the sensing, by a communications device, a carrier located in a first unlicensed frequency band includes: sensing, by the communications device, a first carrier in the first unlicensed frequency band by using a first sensing mechanism, where in the first sensing mechanism, when a sensed carrier is sensed to be idle within at least first preset duration, a channel state of the sensed carrier is determined as idle.

According to the first embodiment of the first aspect, in a second embodiment of the data sending method, the first sensing mechanism includes the following operations: S1. randomly selecting an integer N within a pre-specified non-negative integer range, and setting an initial value of a counter to N; S2. continuously sensing until the sensed carrier is sensed to be idle within the first preset duration; S3. determining whether a count value of the counter is greater than 0; if the count value of the counter is greater than 0, performing S4; and if the count value of the counter is equal to 0, determining that the channel state of the sensed carrier is idle; and S4. continuing to sense the sensed carrier within second preset duration, if the sensed carrier is sensed to be idle within the second preset duration, decreasing the count value of the counter by 1, and returning to perform S3; and if the sensed carrier is sensed to be busy within the second preset duration, returning to perform S2. Total duration of sensing by using the first sensing mechanism is not fixed. Even if two communications devices start to sense a same first carrier at a same moment, if random numbers selected by the two communications devices are different, total duration of sensing by the two communications devices is different, and two communications devices cannot successfully sense at a same moment, so that a collision occurring when communications devices sense is effectively avoided.

According to the first aspect or any one of the foregoing embodiments of the first aspect, in a third embodiment of the data sending method, the sensing, by a communications device, a carrier located in a first unlicensed frequency band further includes: sensing, by the communications device, a second carrier in the first unlicensed frequency band by using a second sensing mechanism, where in the second sensing mechanism, when the sensed carrier is sensed to be idle within at least third preset duration, a channel state of the sensed carrier is determined as idle. Therefore, the communications device may access a plurality of channels more quickly, so that data needing to be sent can be transmitted on as many channels as possible at the same time, thereby effectively improving a data transmission rate and a throughput rate.

According to the third embodiment of the first aspect, in a fourth embodiment of the data sending method, a start time of sensing the second carrier by the communications device by using the second sensing mechanism enables that an end time of sensing the second carrier by using the second sensing mechanism is not later than an end time of sensing the first carrier by using the first sensing mechanism. Therefore, when sensing the first carrier by using the first sensing mechanism ends, sensing the second carrier by using the second sensing mechanism also ends, thereby ensuring that more channels are accessed.

According to the first aspect or any one of the foregoing embodiments of the first aspect, in a fifth embodiment of the data sending method, the communications device senses, by using the first sensing mechanism, a third carrier located in a second unlicensed frequency band.

According to the first aspect or any one of the foregoing embodiments of the first aspect, in a sixth embodiment of the data sending method, the communications device senses, by using the second sensing mechanism, a fourth carrier located in the second unlicensed frequency band. Specifically, a start time of sensing the fourth carrier by the communications device by using the second sensing mechanism enables that an end time of sensing the fourth carrier by using the second sensing mechanism is not later than an end time of sensing the third carrier by using the first sensing mechanism. Carrier sensing is independently performed in each unlicensed frequency band, so that a first communications device can further implement fair contention and fair coexistence between unlicensed frequency bands.

According to the first aspect or any one of the foregoing embodiments of the first aspect, in a seventh embodiment of the data sending method, a carrier is selected as a sensed object of the first sensing mechanism from carriers in each unlicensed frequency band based on a probability of each carrier, where a larger bandwidth of the carrier indicates a higher probability of the carrier. On one hand, unfair contention occurring when different communications devices use a carrier can be avoided as much as possible; and on the other hand, a probability of sending data on a carrier with a larger bandwidth can be higher, and the carrier can be used more properly, thereby effectively improving a data transmission rate and a throughput rate. In some embodiments, among carriers into which a same unlicensed frequency band is divided, a probability corresponding to a carrier may be equal to a ratio of a bandwidth of the carrier to a sum of bandwidths of all the carriers.

Alternatively, when selection is performed based on the probability corresponding to each of the carriers, a smaller bandwidth of the carrier indicates a higher probability that the carrier is selected.

Alternatively, when selection is performed based on the probability corresponding to each of the carriers, probabilities that the carriers are selected are equal.

Alternatively, when selection is performed based on the probability corresponding to each of the carriers, a narrower width of a transmit beam corresponding to the carrier indicates a higher probability that the carrier is selected. The narrower width of the transmit beam indicates less interference to another user, and the another user may have more opportunities to access a channel and perform transmission.

According to the first aspect or any one of the first to the sixth embodiments of the first aspect, in an eighth embodiment of the data sending method, the communications device randomly selects at least one of the carriers into which the same unlicensed frequency band is divided, and senses the selected carrier by using the first sensing mechanism.

According to the first aspect or any one of the first to the sixth embodiments of the first aspect, in a ninth embodiment of the data sending method, the communications device selects at an equal probability or randomly selects at least one of carriers that have maximum bandwidths and into which the same unlicensed frequency band is divided, and senses the selected carrier by using the first sensing mechanism. Therefore, the unfair contention occurring when the different communications devices use a carrier can be further avoided as much as possible, and the carrier can be used more properly, thereby improving a data transmission rate and a throughput rate.

According to the first aspect or any one of the foregoing embodiments of the first aspect, in a tenth embodiment of the data sending method, when at least two carriers exist in the unlicensed frequency band, the carriers in the unlicensed frequency band have same bandwidths.

According to the first aspect or any one of the foregoing embodiments of the first aspect, in an eleventh embodiment of the data sending method, when at least two carriers exist in the unlicensed frequency band, the carriers in the unlicensed frequency band have at least two bandwidths, a sum of bandwidths of carriers into which each unlicensed frequency band is divided may be maximized, widths of guard bandwidths on two sides are reduced, and carrier utilization of the communications devices is improved.

A second aspect provides a communications device, where the communications device includes a processor and a transceiver. The processor is configured to generate data needing to be sent. The transceiver is configured to sense a carrier located in a first unlicensed frequency band, where the first unlicensed frequency band includes at least one carrier; and is further configured to send the data on a carrier whose channel state is sensed to be idle. Therefore, when bandwidths of unlicensed carriers used by communications devices are different, the communications devices may independently sense corresponding unlicensed carriers, and users of different services may fairly contend and coexist in an unlicensed frequency band.

Another aspect of this application provides a computer-readable storage medium, where the computer-readable storage medium stores a computer software instruction used by the foregoing communications device, and when the instruction is run on a computer, the computer is enabled to perform the method described in the foregoing aspects.

DESCRIPTION OF EMBODIMENTS

The following describes the technical solutions in the embodiments of the present application with reference to the accompanying drawings in the embodiments of the present application.

Figure 1:
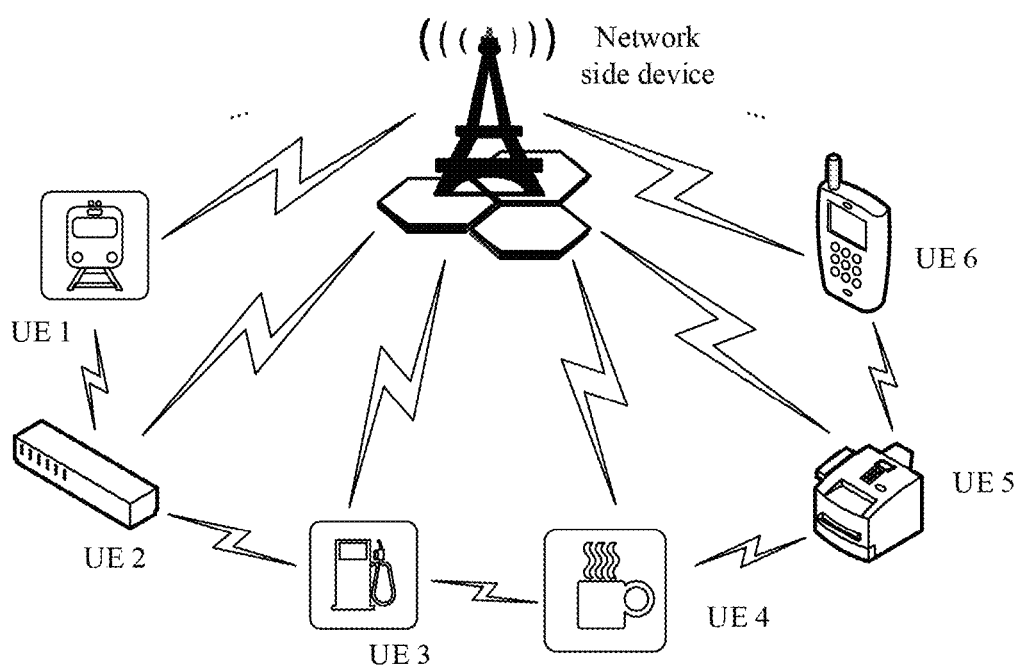
FIG. 1 is an example schematic diagram of a communications system according to an embodiment of the present application.

The technical solutions of the embodiments of the present application described below are applicable to a communications system. The communications system may include a network side device and user equipment (UE) that communicates with the network side device. The user equipment may send data on a carrier located in an unlicensed frequency band, and the network side device receives, on the carrier located in the unlicensed frequency band, the data sent by the user equipment. Alternatively, the network side device sends data on a carrier located in an unlicensed frequency band, and the user equipment receives, on the carrier located in the unlicensed frequency band, the data sent by the network side device. Alternatively, the communications system includes at least two user equipments, where one user equipment sends data on a carrier located in an unlicensed frequency band, and the other user equipment receives the data on the carrier located in the unlicensed frequency band. FIG. 1 is an example of the communications system. The communications system shown in FIG. 1 includes a network side device and a plurality of user equipments (shown as UE1 to UE6 in FIG. 1) that communicate with the network side device, where the user equipments may further communicate with each other.

The network side device may be a device that can communicate with the user equipment. The network side device may be a base station (a macro base station, a small cell/micro base station, a home base station, or the like), a relay station, or an access point. The base station may be a base transceiver station (BTS) in a global system for mobile communications (GSM) or code division multiple access (CDMA) network, an NB (NodeB) in a wideband code division multiple access (WCDMA), an eNB or an eNodeB (evolved NodeB) in Long Term Evolution (LTE), or a gNB in a 5G network or new radio (NR). Alternatively, the network side device may be a transmission reception point (TRPx) in a network. Alternatively, the network side device may be a radio controller in a cloud radio access network (CRAN) scenario. Alternatively, the network side device may be an access point (AP) in WiFi. Alternatively, the network side device may be a wearable device or an in-vehicle device.

The UE may be a station (STA) in WiFi, an access terminal, a subscriber unit, a subscriber station, a mobile station, a remote station, a remote terminal, a mobile device, a user terminal, a terminal, a wireless communications device, a user agent, a user apparatus, or the like. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, an in-vehicle device, a wearable device, user equipment in a future 5G network, or user equipment in a future evolved PLMN.

An unlicensed spectrum resource may be used for a WiFi user, an LTE user, or the like, and may be further used for a 5G user, a user of another service type, or the like in the future. In an unlicensed spectrum, carriers used in different communications systems or communications mechanisms may occupy different bandwidths.

In this embodiment of the present application, one or more unlicensed frequency bands may be obtained by division from unlicensed spectrum for communication. Each unlicensed frequency band may be further divided into one or more sub-bands, and each sub-band corresponds to one carrier. In this embodiment of the present application, each unlicensed frequency band includes at least one carrier.

Figure 2:
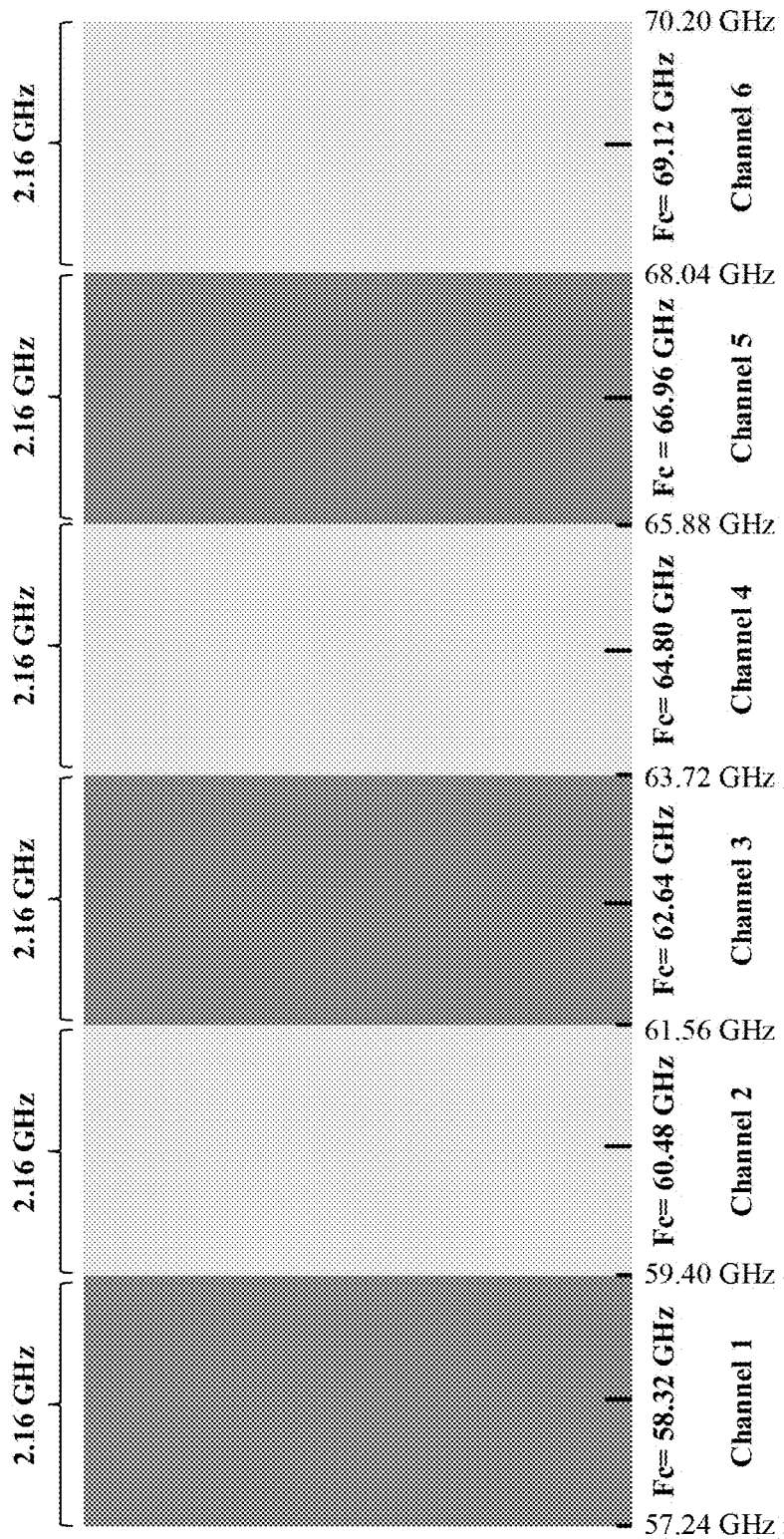
FIG. 2 is a schematic diagram of a frequency band occupied by a carrier used by a WiFi system in a 60-GHz unlicensed frequency band.

For example, for a 60-GHz unlicensed frequency band, a bandwidth of a carrier used by a WiFi system may be 2.16 GHz. FIG. 2 is a schematic diagram of a frequency band occupied by a carrier used by the WiFi system in the 60-GHz unlicensed frequency band. As shown in FIG. 2, the WiFi system uses six carriers in the 60-GHz unlicensed frequency band, and a bandwidth occupied by each carrier is 2.16 GHz. For a center frequency of each carrier, refer to Fc in FIG. 2. For ease of description, the frequency band occupied by each carrier shown in FIG. 2 is referred to as a WiFi frequency band for short.

A 5G communications system may also operate in the foregoing 60-GHz unlicensed frequency band, but a bandwidth occupied by a carrier used by the 5G communications system may be less than 2.16 GHz, for example, may be 2 GHz, 1 GHz, 800 MHz, 500 MHz, 400 MHz, 200 MHz, or 100 MHz. For ease of description, a frequency band occupied by the foregoing carrier used by the 5G communications system is referred to as a 5G frequency band for short. Each 5G frequency band corresponds to one carrier in the 5G communications system.

Figure 3:
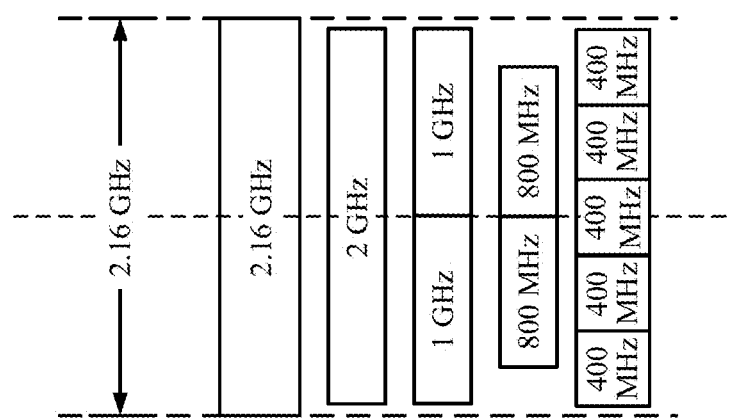
FIG. 3 is a schematic diagram of division of an unlicensed frequency band in a data sending method according to an embodiment of the present application.
Figure 3:
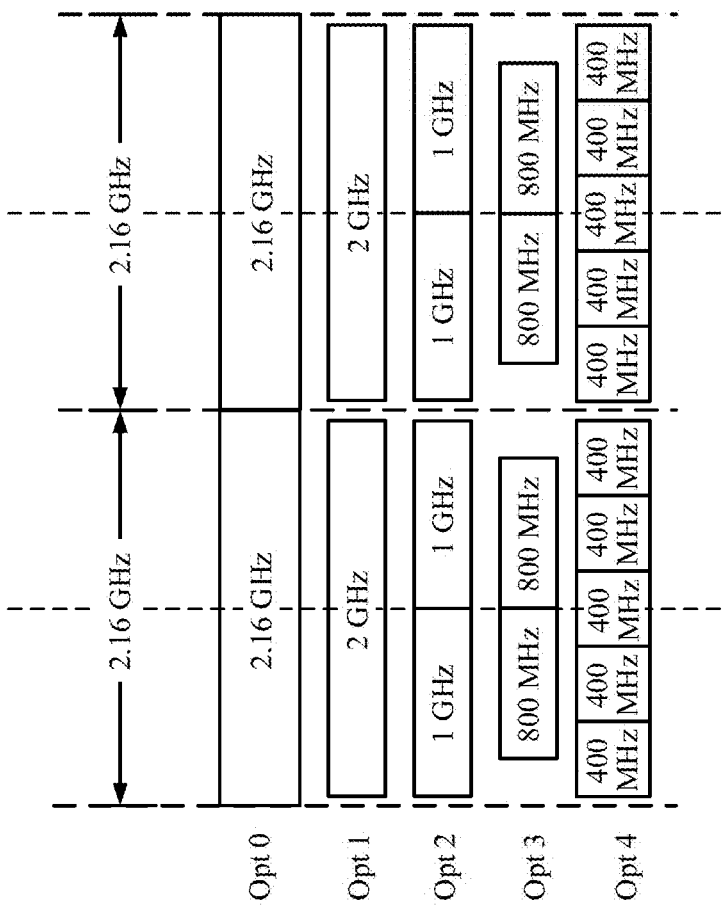

As shown in FIG. 3, Opt0 is a method for dividing a WiFi frequency band in a 60-GHz unlicensed frequency band. Opt1 to Opt4 are four methods for dividing the WiFi frequency band into 5G frequency bands.

Opt1 shows that each WiFi frequency band indicated by Opt0 is divided into a 5G frequency band with a bandwidth of 2 GHz. In the division method, the 5G frequency band occupies a middle part of the WiFi frequency band, and an 80 MHz bandwidth is reserved on each of two sides of the WiFi frequency band to serve as a guard bandwidth.

When one WiFi frequency band is divided into at least two 5G frequency bands, guard bandwidths may also be reserved at two ends of the WiFi frequency band. As shown in FIG. 3, in Op2 to Opt4, guard bandwidths of a same size are reserved at both two ends of a WiFi frequency band.

Guard bandwidths are set, so that mutual interference between carriers that are located in adjacent WiFi frequency bands in the 5G communications system can be effectively avoided.

In an embodiment, in Op2 to Opt4 shown in FIG. 3, bandwidths of all 5G frequency bands into which a same WiFi frequency band is divided may be the same.

In another embodiment, 5G frequency bands into which a same WiFi frequency band is divided have at least two bandwidths. Therefore, a sum of bandwidths of 5G frequency bands into which each WiFi frequency band is divided may be maximized, and widths of the guard bandwidths on the two sides are reduced, thereby improving utilization of the unlicensed spectrum by the 5G communications system. In Opt5 shown in FIG. 4, 5G frequency bands into which a same WiFi frequency band is divided have two bandwidths of 1 GHz and 400 MHz. In Opt6 shown in FIG. 4, 5G frequency bands into which a same WiFi frequency band is divided have two bandwidths of 800 MHz and 400 MHz.

Figure 4:
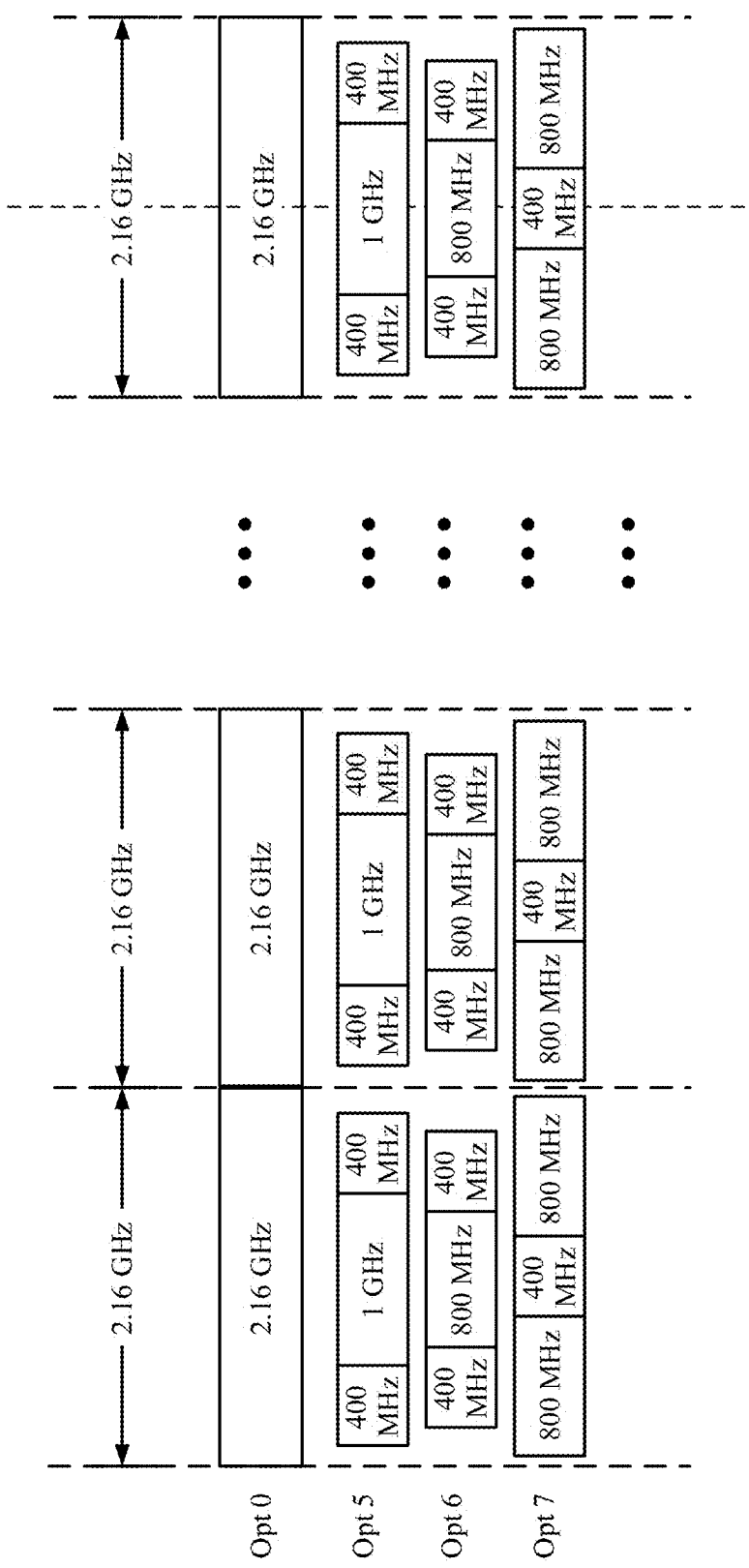
FIG. 4 is another schematic diagram of division of an unlicensed frequency band in a data sending method according to an embodiment of the present application.

In an embodiment, as shown in FIG. 3 and FIG. 4, 5G frequency bands into which a same WiFi frequency band is divided are symmetric with respect to the center of the WiFi frequency band.

Figure 5:
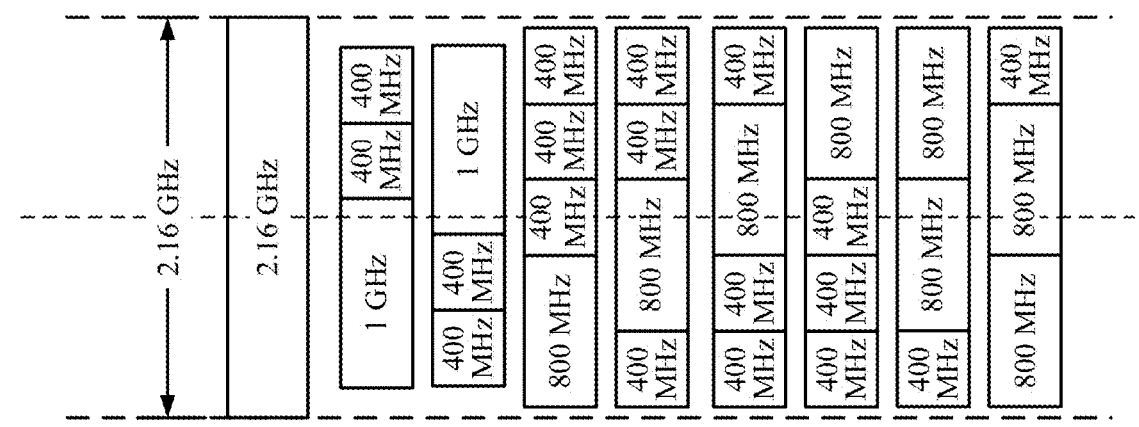
FIG. 5 is still another schematic diagram of division of an unlicensed frequency band in a data sending method according to an embodiment of the present application.
Figure 6:
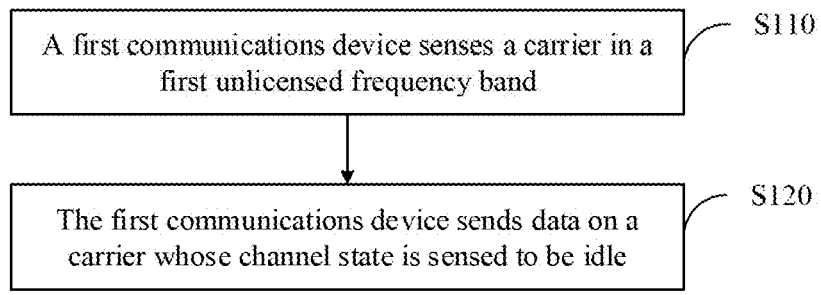
FIG. 6 is an example flowchart of a data sending method according to an embodiment of the present application.

In another embodiment, as shown in FIG. 5, 5G frequency bands into which a same WiFi frequency band is divided are not symmetric with respect to the center of the WiFi frequency band. Therefore, a sum of bandwidths of 5G frequency bands into which each 5G frequency band is divided may be further maximized, and widths of guard bandwidths on two sides are reduced, thereby further improving utilization of the unlicensed spectrum by the 5G communications system. This embodiment of the present application provides a data sending method. As shown in FIG. 6, the method includes:

S110. A first communications device senses a carrier in a first unlicensed frequency band.

In this embodiment, the first unlicensed frequency band may be any WiFi frequency band in the foregoing embodiments, and the carrier in the first unlicensed frequency band may be a carrier corresponding to a 5G frequency band obtained by dividing the WiFi frequency band. In another embodiment, the first unlicensed frequency band may also be any other unlicensed frequency band. The first communications device may be the network side device or the UE in the foregoing embodiments. It may be understood that the "first" used herein and "second" used below are merely used to distinguish between different individuals of a description object of a same type, but there is no priority difference between the different individuals of the description object of the same type.

In this embodiment, a carrier that needs to be used by the first communications device is located in the unlicensed frequency band, and the unlicensed frequency band may be used by any device. Therefore, before performing communication by using the carrier located in the unlicensed frequency band, the first communications device needs to sense the carrier to obtain a channel state of the carrier, to determine, based on the channel state, whether the carrier can be used for communication. If the channel state of the carrier is busy, the first communications device cannot perform communication by using the carrier. If the channel state of the carrier is idle, the first communications device can perform communication by using the carrier.

S120. The first communications device sends data on a carrier whose channel state is sensed to be idle.

In an embodiment, the first communications device may further randomly select one or more carriers in any first unlicensed frequency band to sense.

Figure 7:
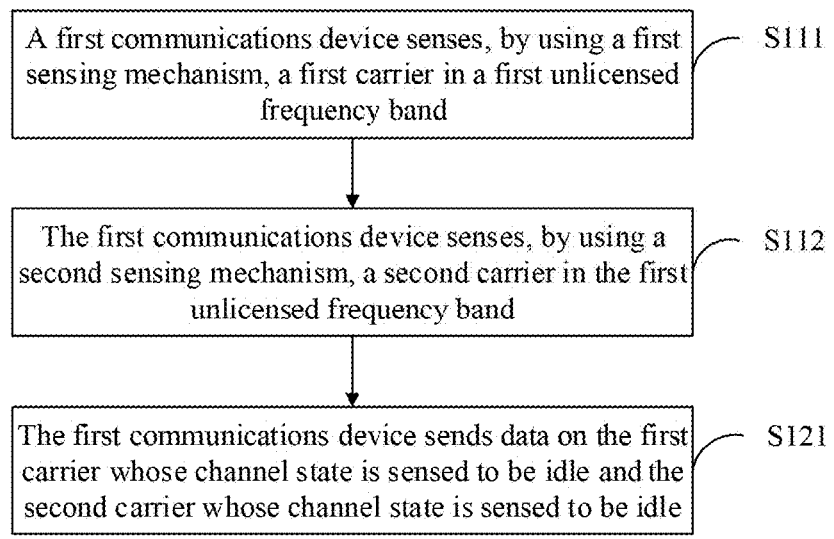
FIG. 7 is another example flowchart of a data sending method according to an embodiment of the present application.

In another embodiment, the sensing may further be performed in the following manners. As shown in FIG. 7, operation S110 specifically includes:

Operation S111. The first communications device senses, by using a first sensing mechanism, a first carrier located in the first unlicensed frequency band.

In this embodiment, in the first sensing mechanism, when the sensed carrier is sensed to be idle within at least first preset duration T1, a channel state of the sensed carrier is determined as idle.

In operation S111, the first carrier in the first unlicensed frequency band may be any carrier in the first unlicensed frequency band. There may be at least one first carrier.

In another embodiment, as shown in FIG. 7, operation S110 may further include:

Operation S112. The first communications device senses, by using a second sensing mechanism, a second carrier in the first unlicensed frequency band. In the second sensing mechanism, when the sensed carrier is sensed to be idle within at least third preset duration T3, a channel state of the sensed carrier is determined as idle. The third preset duration T3 is less than the first preset duration T1.

In this embodiment, the second carrier in the first unlicensed frequency band may be any one carrier or all carriers except the first carrier in the first unlicensed frequency band.

Operation S120 specifically includes:

Operation S121. The first communications device sends data on the first carrier whose channel state is sensed to be idle and the second carrier whose channel state is sensed to be idle. Therefore, the first communications device may access a plurality of channels more quickly, so that the data can be transmitted on as many channels as possible at the same time, thereby effectively improving a data transmission rate and a throughput rate.

Figure 8:
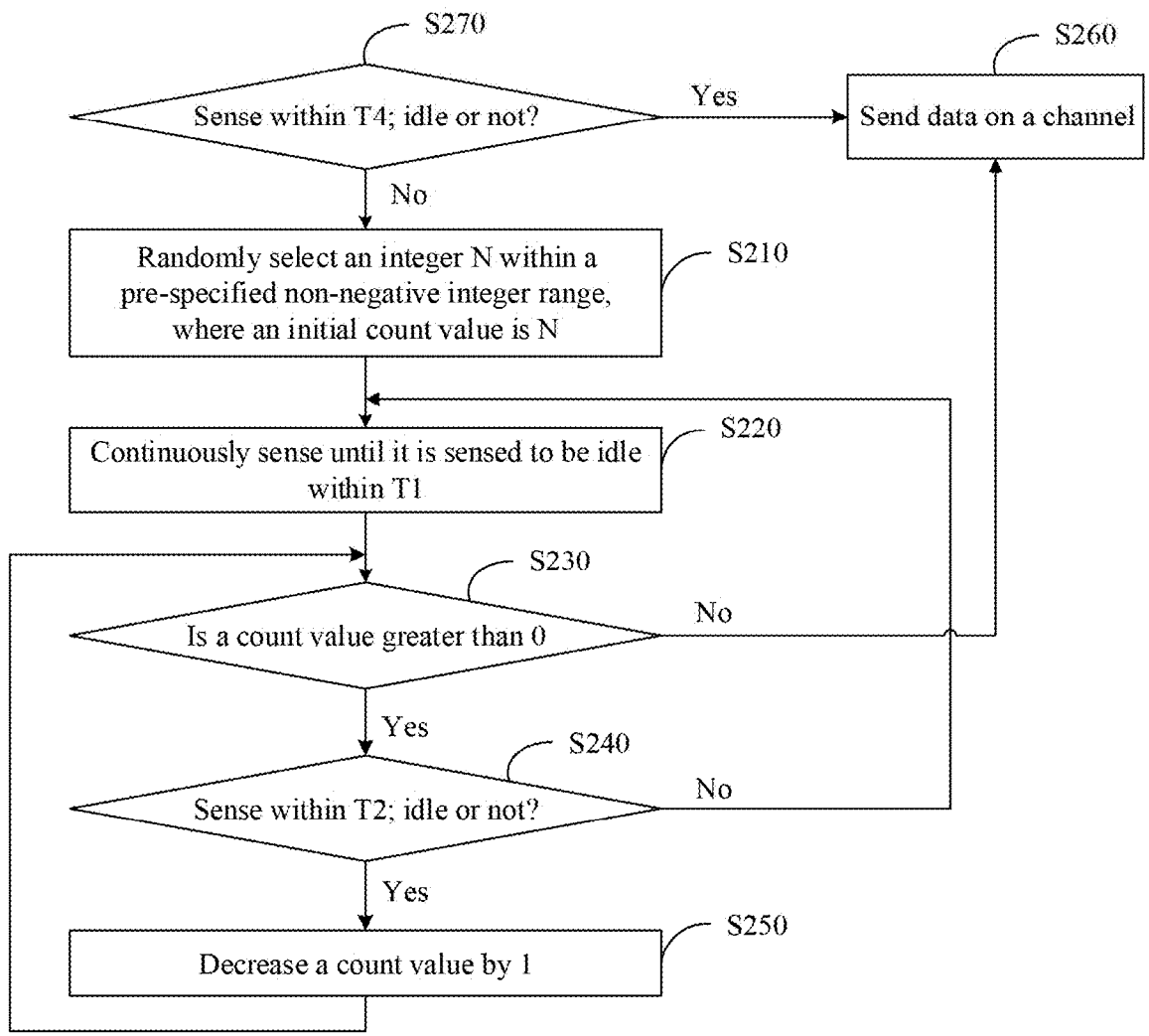
FIG. 8 is an example flowchart of a first sensing mechanism of a data sending method according to an embodiment of the present application.

In an embodiment, as shown in FIG. 8, a sensing process of the first sensing mechanism includes:

S210. Randomly select an integer N within a pre-specified non-negative integer range, and set an initial value of a counter to N.

S220. Continuously sense until the sensed carrier is sensed to be idle within the first preset duration T1.

S230. Determine whether a count value of the counter is greater than 0; if the count value of the counter is greater than 0, perform S240; and if the count value of the counter is equal to 0, determine that the channel state of the sensed carrier is idle, and ending sensing.

S240. Continue to sense the sensed carrier within second preset duration T2, and if the sensed carrier is sensed to be idle within the second preset duration, perform S250; and if the sensed carrier is sensed to be busy within the second preset duration T2, return to perform S220.

S250. Decrease the count value by 1, and return to perform S230.

In this embodiment, duration of sensing a carrier from beginning of sensing to ending of the sensing mechanism reaches at least (T1+N*T2). That is, within T1 that starts from the sensing, the sensed carrier is exactly idle, and the sensed carrier is also idle within subsequent N*T2 duration. In this case, duration of sensing the sensed carrier by using the first sensing mechanism is exactly (T1+N*T2). In another case, the duration of sensing the sensed carrier by using the first sensing mechanism is greater than (T1+N*T2).

After a channel of the sensed carrier is determined to be idle, that is, when the sensing ends, the first communications device may perform operation S260, that is, send data on the sensed carrier.

In another embodiment, before the foregoing operation S210, the sensing process of the first sensing mechanism may further include:

S270. Sense the sensed carrier within fourth preset duration T4; if the sensed carrier is sensed to be idle within the fourth preset duration T4, determine that the channel state of the sensed carrier is idle, and end sensing; and if the sensed carrier is sensed to be busy within the fourth preset duration T4, perform S210. In this embodiment, duration of sensing the sensed carrier by using the first sensing mechanism is not less than the fourth preset duration T4. That is, within the fourth preset duration T4 that starts from the sensing, the sensed carrier is exactly idle. In this case, the duration of sensing the sensed carrier by using the first sensing mechanism is exactly the fourth preset duration T4. In another case, the duration of sensing the sensed carrier by using the first sensing mechanism is greater than the fourth preset duration T4.

In an embodiment, the first preset duration T1 is greater than the second preset duration T2.

In an embodiment, the fourth preset duration T4 is greater than the second preset duration.

In an embodiment, the first preset duration T1 is equal to the fourth preset duration T4.

In an embodiment, a sensing process of the second sensing mechanism may be: performing sensing on the sensed carrier within the third preset duration T3, and if the sensed carrier is sensed to be idle within the third preset duration T3, determining that the channel state of the sensed carrier is idle; or performing sensing on the sensed carrier within the third preset duration T3, and if the sensed carrier is sensed to be busy within the third preset duration T3, determining that the channel state of the sensed carrier is busy. In the second sensing mechanism, after duration of sensing reaches T3, the sensing of the sensed carrier is ended, and if the sensed carrier is sensed to be busy before duration of sensing reaches T3, the sensing of the sensed carrier is ended in advance.

In an embodiment, a start time of sensing the second carrier by the first communications device by using the second sensing mechanism enables that an end time of sensing the second carrier by using the second sensing mechanism is not later than an end time of sensing the first carrier by using the first sensing mechanism. Therefore, when sensing the first carrier by using the first sensing mechanism ends, sensing the second carrier by using the second sensing mechanism also ends, thereby ensuring that more channels are accessed.

In an embodiment, the third preset duration T3 is less than the first preset duration T1. It can be seen from the foregoing embodiments that, when sensing is performed by using the first sensing mechanism, total duration consumed from starting sensing to ending sensing is related to a randomly selected random number N. Because the total sensing duration of the first sensing mechanism is related to the random number N, the total sensing duration of the first sensing mechanism is random to some extent, and a collision with another first communications device that performs sensing by using the first sensing mechanism can be effectively avoided.

For example, several candidate sensing duration with different lengths may be preset. When sensing is performed by using the first sensing mechanism, one of the sensing duration is randomly selected as T1, for example, the selected sensing duration is 34 μs. Then, sensing is performed until the sensed carrier is sensed to continuously keep idle for 34 μs. Therefore, the channel state of the sensed carrier is determined as idle.

In an embodiment, in a 60-GHz frequency band, T1 may be 13 μs and T2 may be 5 μs. In a 5-GHz frequency band, T1 may be 34 μs and T2 may be 9 μs.

Figure 9:
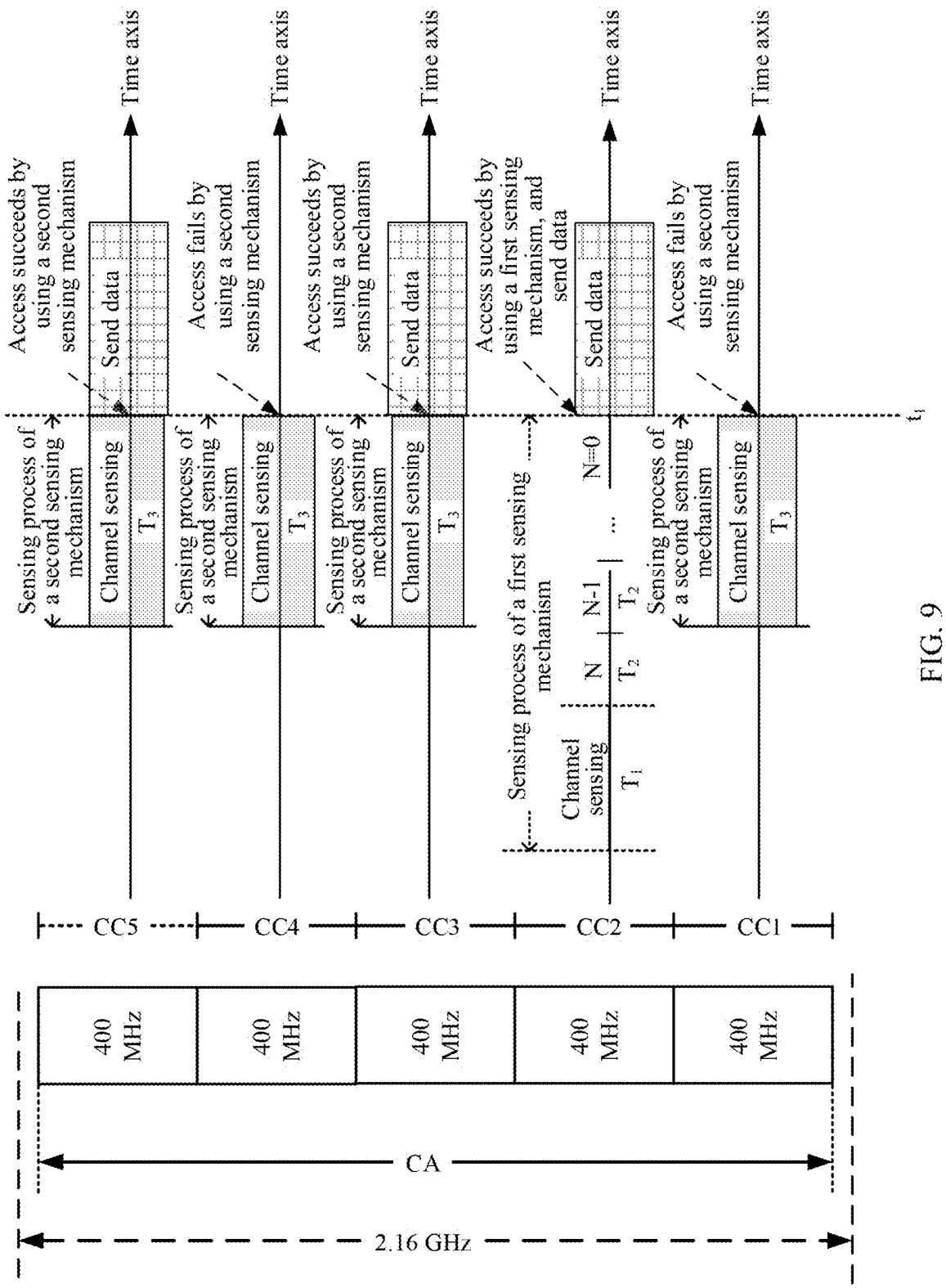
FIG. 9 is a schematic diagram of a data sending method according to an embodiment of the present application.

As shown in FIG. 9, for example, a bandwidth of the first unlicensed frequency band is 2.16 GHz, the first unlicensed frequency band is divided into five carriers, and a bandwidth of each carrier is 400 MHz.

In an embodiment, descriptions are made by using an example in which a carrier whose bandwidth is 400 MHz is selected and the first sensing mechanism is user for the carrier.

As shown in FIG. 9, it is assumed that the selected carrier is a CC2, and the CC2 is sensed by using the first sensing mechanism. Remaining carriers (a CC1, a CC3, a CC4, and a CC5) are sensed by using the second sensing mechanism.

It is assumed that a moment at which it is sensed, by using the first sensing mechanism, that a channel state of the CC2 is idle is t1, that is, a moment at which the first sensing mechanism ends is t1. A start moment of sensing the CC1, the CC3, the CC4, and the CC5 by the first communications device by using the second sensing mechanism may be at least earlier than a moment t1-T3. In this case, it can be ensured that when the first sensing mechanism ends, the second sensing mechanism also ends, so that the first communications device may simultaneously send data on the first carrier whose channel state is sensed to be idle by using the first sensing mechanism and the second carrier whose channel state is sensed to be idle by using the second sensing mechanism. For example, as shown in FIG. 9, at the moment t1, it is just determined that channel states of the CC2, the CC3, and the CC5 are idle. In this case, the first communications device may simultaneously send data on the CC2, the CC3, and the CC5. It may be understood that, as shown in FIG. 9, in the second sensing mechanism, channel states of both the CC3 and the CC5 are idle within previous T3 duration using the moment t1 as an end moment. In this case, it is considered that the channel states of both the CC3 and the CC5 are idle at the moment t1. Once it is determined that the channel states of the CC3 and the CC5 are idle, the CC3 and the CC5 may be used by the first communications device to send data. Therefore, it is also considered that access to channels corresponding to the CC3 and the CC5 by using the second sensing mechanism succeeds, and the first communications device may start to prepare to simultaneously send data on the CC2, the CC3, and the CC5 at the moment t1. On the contrary, for the CC1 and the CC4, channel states of both the CC1 and the CC4 are busy within the previous T3 duration using the moment t1 as an end moment. In this case, it is considered that the channel states of both the CC1 and the CC4 are busy at the moment t1. Therefore, it is considered that access by using the second sensing mechanism fails, and data is not ready to be sent at the moment t1.

Data may be sent in a carrier aggregation (CA) or carrier bonding (CB) manner on a carrier whose channel state is sensed to be idle by using the first sensing mechanism and a carrier whose channel state is sensed to be idle by using the second sensing mechanism, thereby improving a data transmission rate and a data throughput.

The first communications device may communicate with a same device by using all carriers whose channel states are sensed to be idle, or may communicate with different devices separately by using the carriers whose channel states are idle. This is not limited in this embodiment of the present application.

In another embodiment, the first communications device may sense at least two first carriers by using the first sensing mechanism. The first communications device starts to send data on the at least two first carriers only when sensing that channel states of both the at least two first carriers are idle. For example, it is assumed that the CC2 and the CC1 in FIG. 9 are selected, and the first sensing mechanism is used to sense the CC2 and the CC1. Assuming that it is sensed, before the moment t1 by using the first sensing mechanism, that the channel state of the CC1 is idle, the first communications device does not immediately send data on the CC1, and instead waits until it is sensed, by using the first sensing mechanism, that the channel state of the CC2 is also idle, that is, only when waiting until the moment t1 arrives, the first communications device uses the CC1 and the CC2 to send data at the moment t1.

As shown in FIG. 9, a second carrier that is successfully sensed by using the second sensing mechanism is: a second carrier whose channel state is sensed to be idle within the third preset duration T3 before the moment t1.

In an embodiment, the first preset duration T1 is greater than the third preset duration T3. Therefore, it is ensured that minimum duration required from starting sensing to successfully sensing by using the first sensing mechanism is greater than maximum duration required by using the second sensing mechanism, thereby ensuring that each carrier that is successfully sensed by using the second sensing mechanism can be successfully accessed when sensing succeeds by using the first sensing mechanism.

In an embodiment, the third preset duration is greater than the second preset duration.

In an embodiment, in a 60-GHz frequency band, T3 may be 8 μs. In a 5-GHz frequency band, T3 may be 25 μs.

It may be understood that, when a first carrier is selected from a same first unlicensed frequency band, and sensing is performed on the first carrier by using the first sensing mechanism, a total sensing time depends only on a total sensing time of the selected first carrier.

The first communications device senses the first carrier in the first unlicensed frequency band, and sends the data on the first carrier that is successfully sensed. Another communications device may further sense in the first unlicensed frequency band, and send data in the first unlicensed frequency band when sensing successfully. Therefore, users of different services may fairly contend and coexist in an unlicensed frequency band. In addition, a total sensing time of the first communications device mainly depends on the first sensing mechanism, and the data can be sent only when sensing succeeds by using the first sensing mechanism. If a sensing mechanism used when the another communications device senses in the first unlicensed frequency band is also the first sensing mechanism, and is the same as a sensing mechanism mainly used by the first communications device, fair contention and fair coexistence can be further implemented for the users of different service in the unlicensed frequency band.

In an embodiment, operation S111 further includes:

selecting, by the first communications device, a carrier as a sensed object, that is, the first carrier, of the first sensing mechanism from the carriers in the first unlicensed frequency band based on a probability of each carrier.

A larger bandwidth of the carrier indicates a higher probability of the carrier. That is, a carrier with a larger bandwidth is more likely to be sensed by using the first sensing mechanism. Some communications devices may need to sense only one carrier, the communications device is referred to as a second communications device, and the second communications device may sense only by using the first sensing mechanism. However, the first communications device selects, for example, a carrier from the carriers. The first communications device senses only the selected carrier by using the first sensing mechanism, and senses, by using the second sensing mechanism, other carriers that are not selected. Therefore, the carriers that are not selected may be accessed only by using the second sensing mechanism. If a carrier sensed by the second communications device belongs to one of the carriers sensed by the first communications device by using the second sensing mechanism, sensing mechanisms used by the first communications device and the second communications device on a same carrier are different. The first communications device accesses the same carrier more easily, that is, the carriers not selected by the first communications device may cause unfair contention between different communications devices during use of a carrier. Therefore, when the first communications device selects a carrier that is used as a sensed object of the first sensing mechanism, a larger bandwidth of the carrier indicates a higher probability of being selected. Therefore, a probability of a carrier with a narrower bandwidth not being selected is higher, and the unfair contention between the different communications devices during use of a carrier can be avoided as much as possible. In addition, the selected carrier that is sensed by using the first sensing mechanism plays a dominant role. Data can start to be sent only when a channel state of the carrier is sensed to be idle, and data may be sent only when another carrier is successfully sensed on this basis by using the second sensing mechanism. Therefore, a larger bandwidth of the carrier indicates a higher probability of being selected, so that there is a higher probability that data is sent on the carrier with a larger bandwidth, and the carrier can be used more properly, thereby improving a data transmission rate and a throughput rate.

Figure 10:
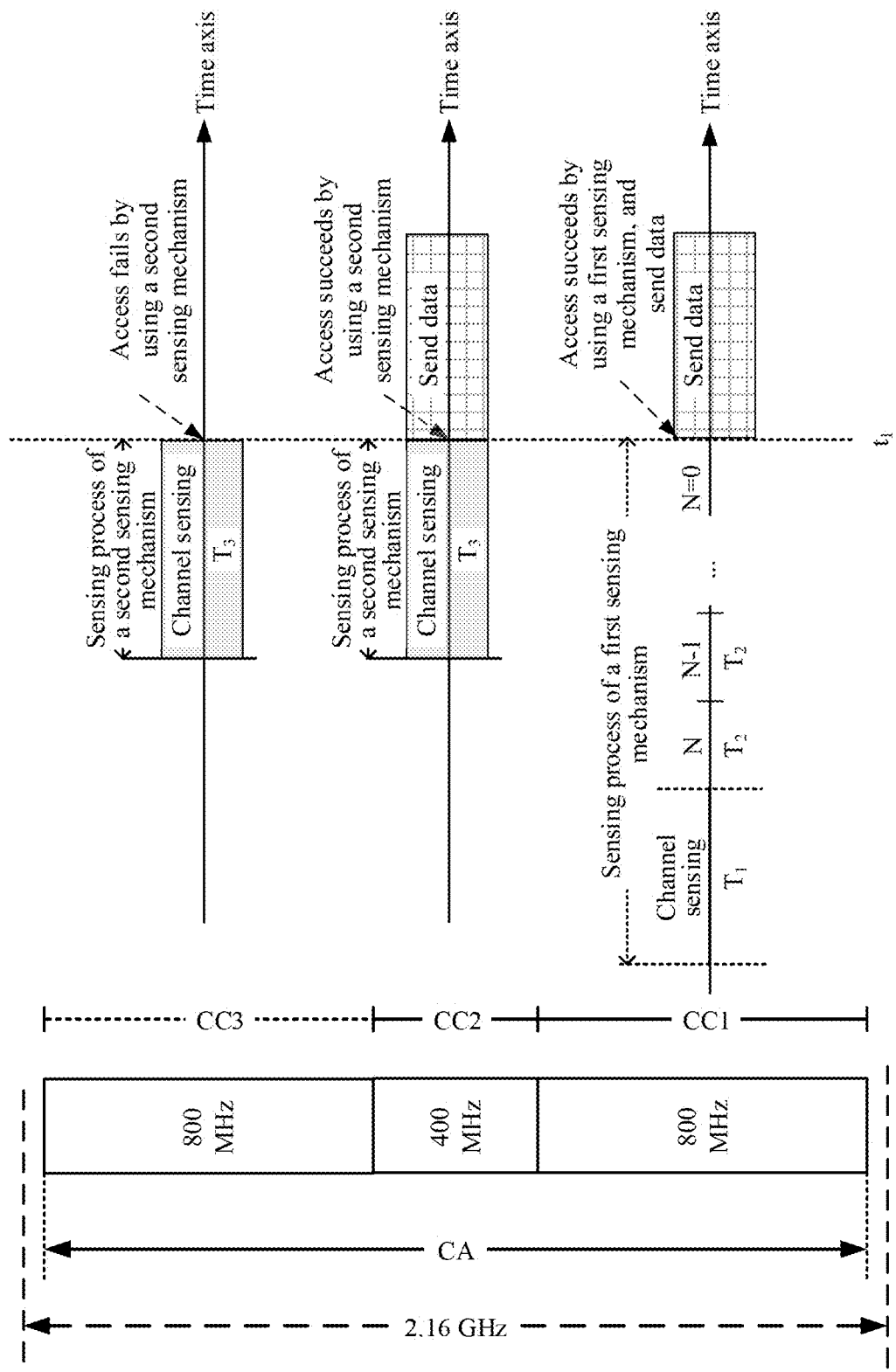
FIG. 10 is another schematic diagram of a data sending method according to an embodiment of the present application.

As shown in FIG. 10, for example, a bandwidth of the first unlicensed frequency band is 2.16 GHz, the first unlicensed frequency band is divided into three carriers, where bandwidths of two carriers are each 800 MHz, and a bandwidth of the remaining carrier is 400 MHz. In this case, a probability that the carrier whose bandwidth is 800 MHz is selected as a sensed object of the first sensing mechanism is greater than a probability that the carrier whose bandwidth is 400 MHz is selected as a sensed object of the first sensing mechanism.

In some embodiments, a probability corresponding to a carrier may be equal to a ratio of a bandwidth of the carrier to a sum of bandwidths of all carriers. As shown in FIG. 10, a sum of bandwidths of carriers into which the first unlicensed frequency band is divided is 2000 MHz. A bandwidth of a CC1 is 800 MHz, and a probability that the CC1 is selected is 800/2000=0.4; a bandwidth of a CC2 is 400 MHz, and a probability that the CC2 is selected is 400/2000=0.2; and a bandwidth of a CC3 is 800 MHz, and a probability that the CC3 is selected is 800/2000=0.4.

In another embodiment, when a carrier is selected as a sensed object of the first sensing mechanism based on a probability corresponding to each carrier, a smaller bandwidth of the carrier indicates a higher probability that the carrier is selected.

In another embodiment, when a carrier is selected as a sensed object of the first sensing mechanism based on a probability corresponding to each carrier, probabilities that the carriers are selected are equal.

In another embodiment, when a carrier is selected as a sensed object of the first sensing mechanism based on a probability corresponding to each carrier, a larger width of a transmit beam corresponding to the carrier indicates a higher probability that the carrier is selected.

In another embodiment, when a carrier is selected as a sensed object of the first sensing mechanism based on a probability corresponding to each carrier, a smaller width of a transmit beam corresponding to the carrier indicates a higher probability that the carrier is selected. The selected carrier that is sensed by using the first sensing mechanism plays a dominant role. Data can start to be sent only when a channel state of the carrier is sensed to be idle, and data may be sent only when another carrier is successfully sensed on this basis by using the second sensing mechanism. Therefore, a smaller width of a transmit beam corresponding to the carrier indicates a higher probability of being selected, so that there is a higher probability that the first communications device sends data on the carrier with a narrower transmit beam, interference to another user is less, and the another user may have more opportunities to access a channel and perform transmission.

Specifically, a width of a transmit beam corresponding to each carrier may be determined in the following manner:

Before sensing each carrier, the first communications device first pre-determines a receiving device corresponding to each carrier. For example, it is assumed that a first unlicensed frequency band is divided into five carriers: a CC1 to a CC5. It is assumed that the first communications device pre-determines that receiving devices corresponding to the CC1 and the CC2 are A, a receiving device corresponding to the CC3 is B, and receiving devices corresponding to the CC4 and the CC5 are C. The first communications device performs beam training with each receiving device, and determines, based on a beam training result, a beam width used when data is sent to each receiving device. For example, a smaller width of a transmit beam indicates a higher probability of being selected. It is assumed that a beam width corresponding to the receiving device C is less than a beam width corresponding to the receiving device A, and the beam width corresponding to the receiving device A is less than a beam width corresponding to the receiving device B. Therefore, probabilities that the CC4 and the CC5 are selected as sensed objects of the first sensing mechanism are the largest; probabilities that the CC1 and the CC2 are selected as sensed objects of the first sensing mechanism are less than the probabilities that the CC4 and the CC5 are selected as sensed objects of the first sensing mechanism; and a probability that the CC3 is selected as a sensed object of the first sensing mechanism is less than the probabilities that the CC1 and the CC2 are selected as sensed objects of the first sensing mechanism. It is assumed that the CC5 is selected as a sensed object of the first sensing mechanism, and when it is sensed, by using the first sensing mechanism, that a channel state of the CC5 is idle, it is further sensed, by using the second sensing mechanism, that channel states of the CC4 and the CC3 are idle. Therefore, data is sent to the receiving device C on the CC4 and the CC5, and data is sent to the receiving device B on the CC3. The first communications device does not send data on the CC1 and the CC2.

In another embodiment, operation S111 includes:

The first communications device randomly selects a carrier (that is, the first carrier in the foregoing embodiments) in the first unlicensed frequency band as a sensed object of the first sensing mechanism, and senses the selected carrier by using the first sensing mechanism. That is, each carrier has an equal probability of being selected as a sensed object of the first sensing mechanism.

In another embodiment, operation S111 includes:

The first communications device randomly selects at least one carrier from carriers with a maximum bandwidth in the first unlicensed frequency band, and senses the selected carrier by using the first sensing mechanism.

In another embodiment, operation S111 includes:

The first communications device selects at an equal probability at least one carrier from carriers with a maximum bandwidth in the first unlicensed frequency band, and senses the selected carrier by using the first sensing mechanism. That is, each carrier with a maximum bandwidth in the first unlicensed frequency band has an equal probability of being selected as a sensed object of the first sensing mechanism. On one hand, unfair contention occurring when different first communications devices use a carrier can be further avoided as much as possible; and on the other hand, a probability that the first communications device sends data on a carrier with a larger bandwidth can be higher, and the carrier can be used more properly, thereby improving a data transmission rate and a throughput rate.

In an embodiment, the first communications device independently senses carriers in each unlicensed frequency band. For example, in addition to sensing the carriers in the first unlicensed frequency band, the first communications device can further sense a carrier in a second unlicensed frequency band. In this embodiment of the present application, the second unlicensed frequency band is any one of or all of the unlicensed frequency bands except the first unlicensed frequency band.

In an embodiment, the sensing, by the first communications device, a carrier in a second unlicensed frequency band includes:

sensing, by the first communications device by using the first sensing mechanism, a third carrier located in the second unlicensed frequency band.

In an embodiment, the sensing, by the first communications device, a carrier in a second unlicensed frequency band further includes:

sensing, by the first communications device by using the second sensing mechanism, a fourth carrier located in the second unlicensed frequency band.

In an embodiment, a start time of sensing the fourth carrier by the first communications device by using the second sensing mechanism enables that an end time of sensing the fourth carrier by using the second sensing mechanism is not later than an end time of sensing the third carrier by using the first sensing mechanism.

For specific details of sensing by the first communications device in the second unlicensed frequency band, refer to details of the sensing in the first unlicensed frequency band, and details are not described herein again.

Figure 11A:
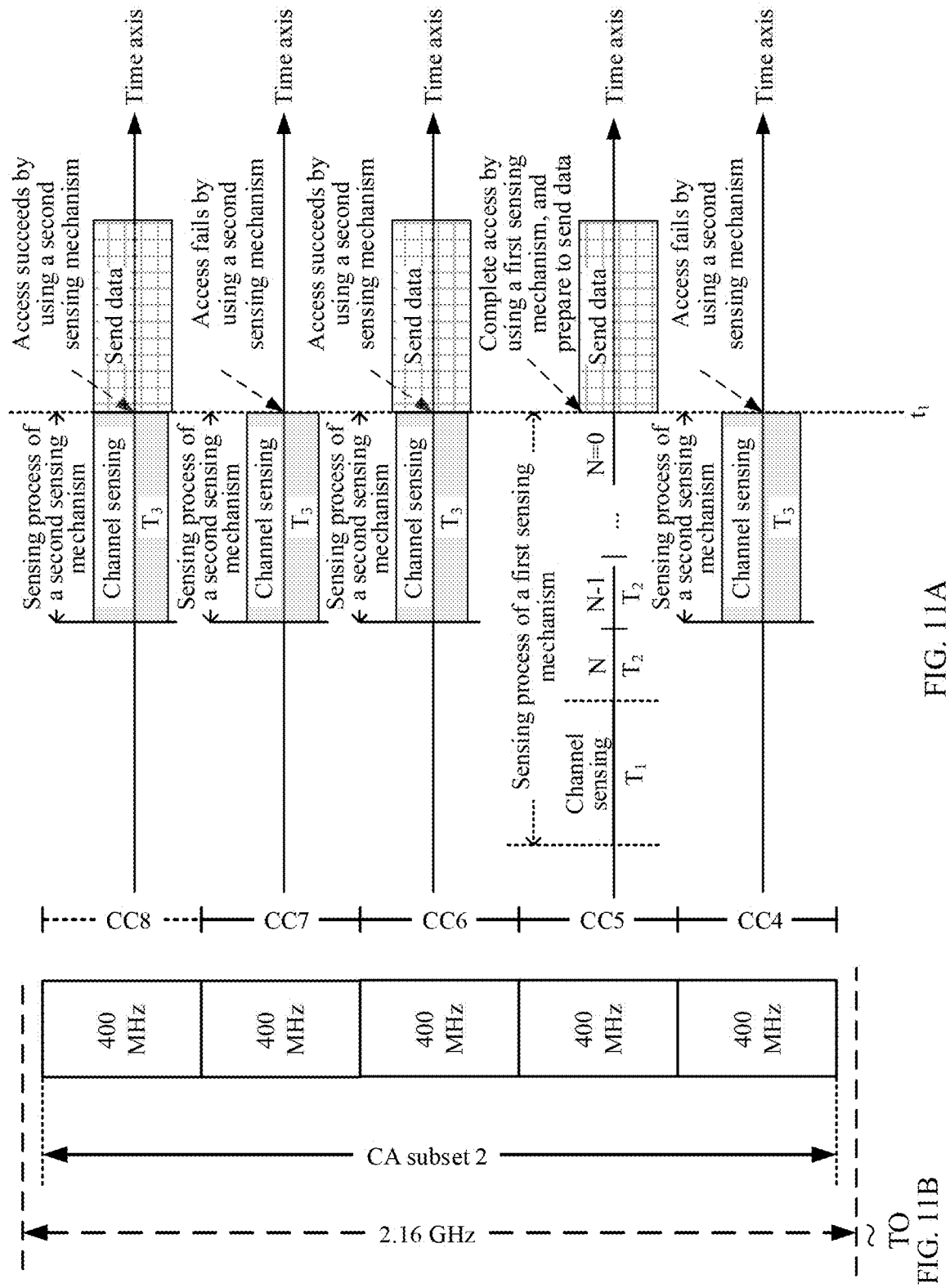
FIG. 11A and FIG. 11B are still another schematic diagram of a data sending method according to an embodiment of the present application.
Figure 11B:
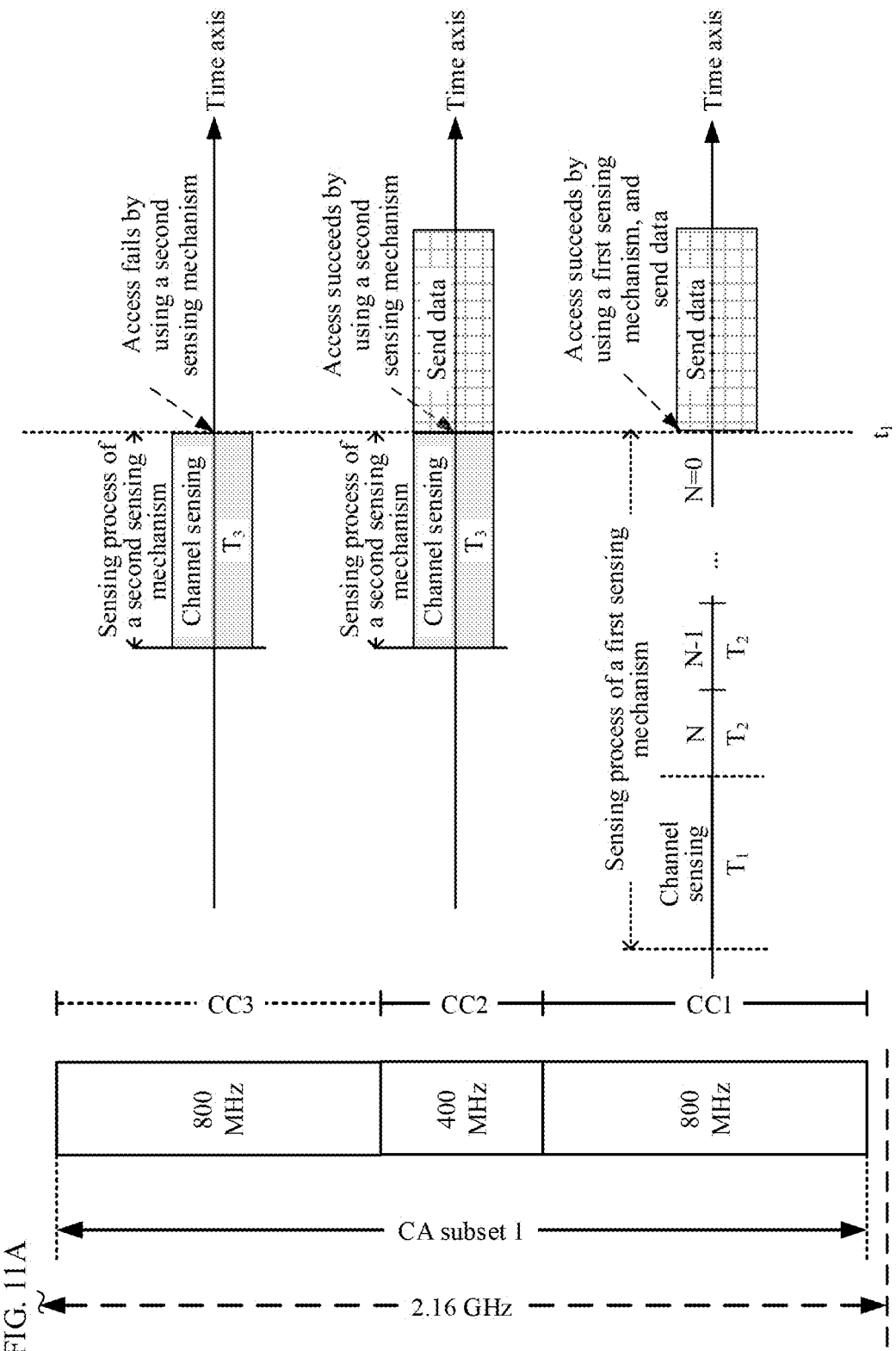

Sensing is independently performed in each unlicensed frequency band, so that the first communications device can further implement fair contention and fair coexistence between unlicensed frequency bands. As shown in FIG. 11A and FIG. 11B, the first communications device senses on carriers in two unlicensed frequency bands. One unlicensed frequency band is divided into three carriers: a CC1, a CC2, and a CC3; and the other unlicensed frequency band is divided into five carriers: a CC4, a CC5, a CC6, a CC7, and a CC8.

The first communications device selects one of the CC1, the CC2, and the CC3, for example, selects the CC1, senses on the CC1 by using the first sensing mechanism, and senses on the CC2 and the CC3 by using the second sensing mechanism. At a moment t2, a channel state of the CC1 is sensed to be idle, and a channel state of the CC2 is also sensed to be idle. Therefore, the first communications device may simultaneously send data on the CC1 and the CC2.

The first communications device selects one of the CC4, the CC5, the CC6, the CC7, and the CC8, for example, selects the CC5, senses on the CC5 by using the first sensing mechanism, and senses on the CC4, the CC6, the CC7, and the CC8 by using the second sensing mechanism. At a moment t1, a channel state of the CC5 is sensed to be idle, and channel states of both the CC6 and the CC8 are also sensed to be idle. Therefore, the first communications device may simultaneously send data on the CC5, the CC6, and the CC8.

In addition, the sensing in the foregoing embodiments may be clear channel assessment (CCA), a listen before talk (LBT) mechanism, a directional CCA, or a directional LBT.

Figure 12:
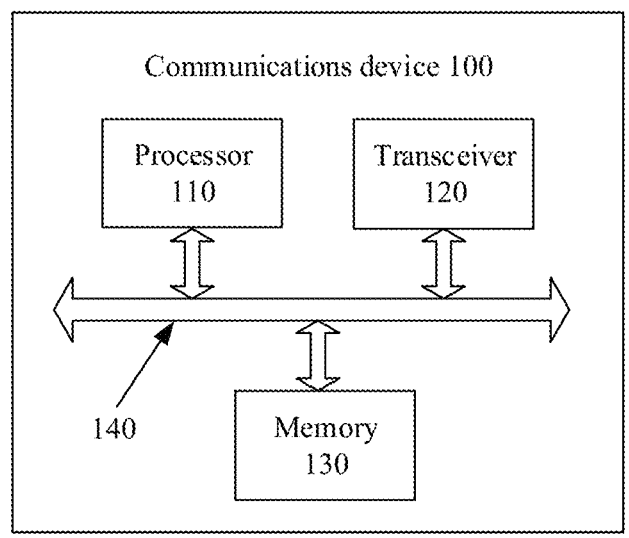
FIG. 12 is an example schematic structural diagram of hardware of a communications device according to an embodiment of the present application.

The present application further provides a communications device 100. The communications device 100 may be the first communications device described in the foregoing embodiments. As shown in FIG. 12, the communications device 100 includes a processor 110 and a transceiver 120. The processor 110 is connected to the transceiver 120. In some embodiments, the terminal 100 further includes a memory 130. The memory 130 is separately connected to the processor 110 and the transceiver 120. In some embodiments, the terminal 100 further includes a bus system 140, where the processor 110, the transceiver 120, and the memory 130 may be connected by using the bus system 140. The memory 140 may be configured to store an instruction, and the processor 110 is configured to execute the instruction stored in the memory 140, to control the transceiver 120 to receive and send a signal. The memory 140 may be further configured to cache data generated when the processor 110 executes the instruction.

The processor 110 is configured to generate data needing to be sent.

The transceiver 120 is configured to sense a carrier located in a first unlicensed frequency band, where the first unlicensed frequency band includes at least one carrier; and is further configured to send the data on a carrier whose channel state is sensed to be idle.

It can be learned from the foregoing embodiments that the communications device 100 shown in FIG. 12 performs operations S110, S120, S111, S112, and S121 in the foregoing method embodiments. For more details about performing the foregoing operations by the processor 110 and the transceiver 120, refer to related descriptions in the foregoing method embodiments. Details are not described herein again.

In this embodiment of the present application, the communications device senses a first carrier in the first unlicensed frequency band, and sends data on the first carrier that is sensed successfully. Another communications device may also sense in the first unlicensed frequency band, and send data in the first unlicensed frequency band when sensing successfully. Therefore, when bandwidths of unlicensed carriers used by communications devices are different, the communications devices may independently sense corresponding unlicensed carriers, and users of different services may fairly contend and coexist in an unlicensed frequency band.

For other functions of the processor 110 and the transceiver 120, refer to descriptions of corresponding embodiments in the foregoing data sending method. Details are not described herein again.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

To sum up, the foregoing descriptions are merely embodiments of the present application, but are not intended to limit the protection scope of the present application. Any modification, equivalent replacement, or improvement made without departing from and principle of the present application shall fall within the protection scope of the present application.

The invention claimed is:

1. A data sending method, comprising:
   sensing, by a communications device, a first carrier located in a first unlicensed frequency band using a first sensing mechanism, wherein the first unlicensed frequency band comprises at least one carrier, the first unlicensed frequency band comprises a guard band to prevent mutual interference;
   sensing, by the communications device, a second carrier in the first unlicensed frequency band using a second sensing mechanism, wherein a start time of sensing the second carrier using the second sensing mechanism is configured, such that an end time of sensing the second carrier using the second sensing mechanism is not later than an end time of sensing the first carrier using the first sensing mechanism; and
   sending, by the communications device, data on a carrier whose channel state is sensed to be idle.

2. The method according to claim 1, wherein the first unlicensed frequency band comprises at least one frequency band whose bandwidth is approximately 1 GHz and at least one frequency band whose bandwidth is approximately 400 MHZ, or the first unlicensed frequency band comprises at least one frequency band whose bandwidth is approximately 800 MHz and at least one frequency band whose bandwidth is approximately 400 MHz.

3. The method according to claim 1, wherein the first unlicensed frequency band comprises at least one frequency band whose bandwidth is approximately 2 GHZ, or the first unlicensed frequency band comprises at least one frequency band of approximately 1 GHz, or the first unlicensed frequency band comprises at least one frequency band of approximately 800 MHZ, or the first unlicensed frequency band comprises at least one frequency band of approximately 400 MHz.

4. The method according to claim 2, wherein a frequency band comprised in the first unlicensed frequency band is symmetric with respect to a center of the first unlicensed frequency band.

5. The method according to claim 3, wherein each frequency band comprised in the first unlicensed frequency band is symmetric with respect to a center of the first unlicensed frequency band.

6. The method according to claim 1, wherein when the first carrier is sensed to be idle within at least a first preset duration, a channel state of the first carrier is determined as idle.

7. The method according to claim 6, wherein the first sensing mechanism is configured to perform following operations:
   (S1). randomly selecting an integer N within a pre-specified non-negative integer range, and setting an initial value of a counter to N;
   (S2). continuously sensing until the first carrier is sensed to be idle within the first preset duration;
   (S3). determining whether a count value of the counter is greater than 0; if the count value of the counter is greater than 0, performing S4; and if the count value of the counter is equal to 0, determining that the channel state of the first carrier is idle; and
   (S4). continuing to sense the first carrier within a second preset duration, if the first carrier is sensed to be idle within the second preset duration, decreasing the count value of the counter by 1, and returning to perform S3;

and if the first carrier is sensed to be busy within the second preset duration, returning to perform S2.

8. The method according to claim 6, wherein when the second carrier is sensed to be idle within at least a third preset duration, a channel state of the second carrier is determined as idle.

9. The method according to claim 6, further comprising:
sensing, by the communications device by using the first sensing mechanism, a third carrier located in a second unlicensed frequency band.

10. A communications device, comprising:
a processor configured to generate data to be sent; and
a transceiver configured to
sense a first carrier located in a first unlicensed frequency band using a first sensing mechanism, wherein the first unlicensed frequency band comprises at least one carrier, the first unlicensed frequency band comprises a guard band to prevent mutual interference,
sense a second carrier in the first unlicensed frequency band using a second sensing mechanism, wherein a start time of sensing the second carrier using the second sensing mechanism, such that an end time of sensing the second carrier using the second sensing mechanism is not later than an end time of sensing the first carrier using the first sensing mechanism, and
send the data on a carrier whose channel state is sensed to be idle.

11. The communications device according to claim 10, wherein the first unlicensed frequency band comprises at least one frequency band whose bandwidth is approximately 1 GHz and at least one frequency band whose bandwidth is approximately 400 MHz, or the first unlicensed frequency band comprises at least one frequency band whose bandwidth is approximately 800 MHz and at least one frequency band whose bandwidth is approximately 400 MHz.

12. The communications device according to claim 10, wherein the first unlicensed frequency band comprises at least one frequency band whose bandwidth is approximately 2 GHz, or the first unlicensed frequency band comprises at least one frequency band of approximately 1 GHz, or the first unlicensed frequency band comprises at least one frequency band of approximately 800 MHZ, or the first unlicensed frequency band comprises at least one frequency band of approximately 400 MHz.

13. The communications device according to claim 11, wherein a frequency band comprised in the first unlicensed frequency band is symmetric with respect to a center of the first unlicensed frequency band.

14. The communications device according to claim 12, wherein each frequency band comprised in the first unlicensed frequency band is symmetric with respect to a center of the first unlicensed frequency band.

15. The communications device according to claim 10, wherein when the first carrier is sensed to be idle within at least a first preset duration, a channel state of the first carrier is determined as idle.

16. The communications device according to claim 15, wherein the first sensing mechanism is configured to perform following operations:
(S1). randomly selecting an integer N within a pre-specified non-negative integer range, and setting an initial value of a counter to N;
(S2). continuously sensing until the first carrier is sensed to be idle within the first preset duration;
(S3). determining whether a count value of the counter is greater than 0; if the count value of the counter is greater than 0, performing S4; and if the count value of the counter is equal to 0, determining that the channel state of the first carrier is idle; and
(S4). continuing to sense the first carrier within a second preset duration, if the first carrier is sensed to be idle within the second preset duration, decreasing the count value of the counter by 1, and returning to perform S3; and if the first carrier is sensed to be busy within the second preset duration, returning to perform S2.

17. The communications device according to claim 15, wherein when the second carrier is sensed to be idle within at least a third preset duration, a channel state of the second carrier is determined as idle.

18. The communications device according to claim 15, wherein the transceiver is further configured to sense, using the first sensing mechanism, a third carrier located in a second unlicensed frequency band.

19. A non-transitory machine-readable storage medium having instructions stored therein, which when executed by a processor, cause the processor to perform operations, the operations comprising:
sensing, by a communications device, a first carrier located in a first unlicensed frequency band using a first sensing mechanism, wherein the first unlicensed frequency band comprises at least one carrier, the first unlicensed frequency band comprises a guard band to prevent mutual interference;
sensing, by the communications device, a second carrier in the first unlicensed frequency band using a second sensing mechanism, wherein a start time of sensing the second carrier using the second sensing mechanism is configured, such that an end time of sensing the second carrier using the second sensing mechanism is not later than an end time of sensing the first carrier using the first sensing mechanism; and
sending, by the communications device, data on a carrier whose channel state is sensed to be idle.

20. The non-transitory machine-readable storage medium according to claim 19, wherein the first unlicensed frequency band comprises at least one frequency band whose bandwidth is approximately 1 GHz and at least one frequency band whose bandwidth is approximately 400 MHZ, or the first unlicensed frequency band comprises at least one frequency band whose bandwidth is approximately 800 MHz and at least one frequency band whose bandwidth is approximately 400 MHz.

\* \* \* \* \*